(12) United States Patent
Scheinert

(10) Patent No.: US 6,574,472 B1
(45) Date of Patent: Jun. 3, 2003

(54) TRANSCEIVER FOR AMPLIFICATION BETWEEN STATIONARY AND MOBILE STATIONS WITH RADIO CHANNEL RECOGNITION

(75) Inventor: Stefan Scheinert, San Diego, CA (US)

(73) Assignee: Littlefeet, Inc., Poway, CA (US)

( * ) Notice: Subject to any disclaimer, the term of this patent is extended or adjusted under 35 U.S.C. 154(b) by 0 days.

(21) Appl. No.: 09/446,236

(22) PCT Filed: Jun. 25, 1998

(86) PCT No.: PCT/EP98/03880

§ 371 (c)(1),
(2), (4) Date: Dec. 17, 1999

(87) PCT Pub. No.: WO99/00918

PCT Pub. Date: Jan. 7, 1999

(30) Foreign Application Priority Data

Jun. 25, 1997 (DE) .......................................... 197 26 940

(51) Int. Cl.[7] .................................................. H04Q 7/20
(52) U.S. Cl. ................... 455/434; 455/67.1; 455/226.1; 455/226.2

(58) Field of Search ................................. 455/7, 9, 11.1, 455/15, 20, 21, 22, 23, 25, 67.1, 67.3, 73, 150.1, 154.1, 161.1, 161.3, 226.1, 226.2, 422, 423, 434, 571, 550

(56) References Cited

U.S. PATENT DOCUMENTS

| | | | | |
|---|---|---|---|---|
| 5,023,930 A | * | 6/1991 | Leslie | 455/11.1 |
| 5,133,080 A | * | 7/1992 | Borras | 455/9 |
| 5,179,720 A | * | 1/1993 | Grube et al. | 455/20 |
| 5,541,979 A | * | 7/1996 | Leslie et al. | 455/11.1 |
| 5,548,803 A | * | 8/1996 | Evans | 455/571 |

FOREIGN PATENT DOCUMENTS

| | | | | |
|---|---|---|---|---|
| EP | 0274857 A1 | * | 7/1988 | H04B/7/26 |
| GB | 2260467 A | * | 4/1993 | H04B/7/204 |

* cited by examiner

*Primary Examiner*—Quochien Vuong
(74) *Attorney, Agent, or Firm*—Frank H. Foster; Kremblas, Foster, Phillips & Pollick

(57) ABSTRACT

The invention is directed towards a transmitting/receiving device for amplification of the transmitted signals between a stationary transmitting station and a mobile transmitting station in a full-coverage radio network and also towards an operating process for said transmitting/receiving device.

27 Claims, 4 Drawing Sheets

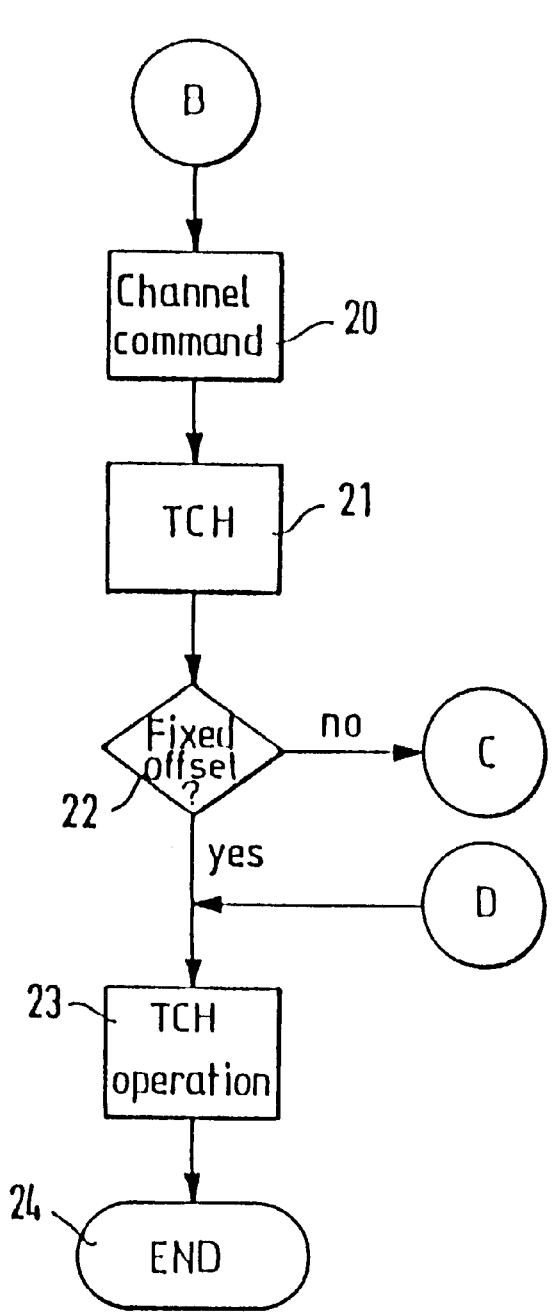
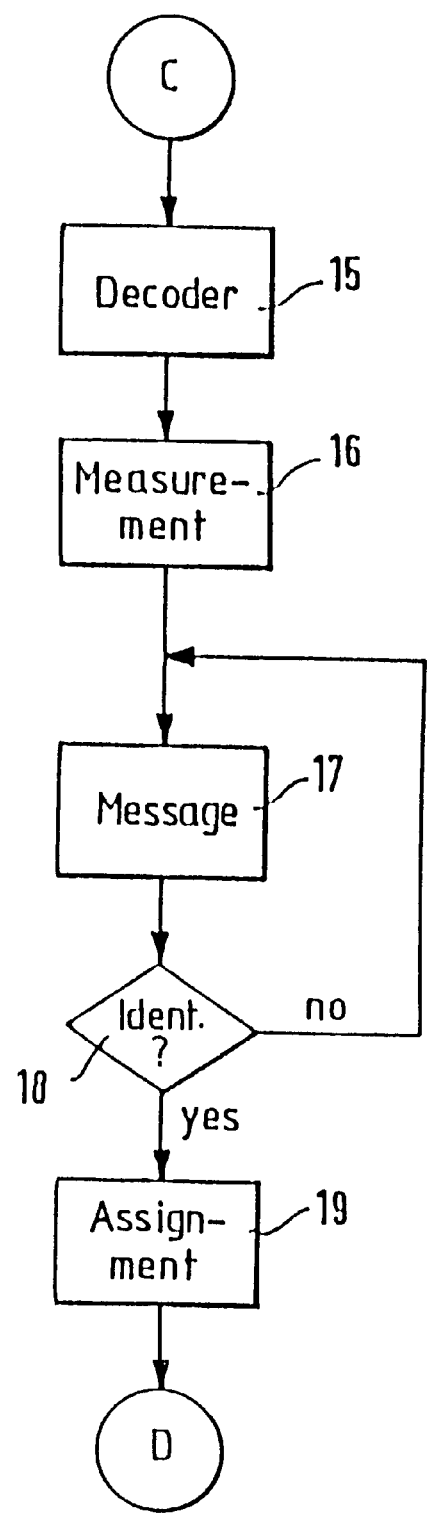
FIG. 5
FIG. 6

TRANSCEIVER FOR AMPLIFICATION BETWEEN STATIONARY AND MOBILE STATIONS WITH RADIO CHANNEL RECOGNITION

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not applicable)

BACKGROUND OF THE INVENTION

1. Field of Invention

The invention is directed towards a transmitting/receiving device for amplification of the transmitted signals between a stationary transmitting station and a mobile transmitting station in a full-coverage radio network and also towards a process for operating such a transmitting/receiving device.

2. Description of the Related Art

The various possibilities of mobile radiotelephones were recognised very quickly by the business world and in the meantime have formed the basis for the success of many a businessman. This results from the advantage that, in principle, a person can be reached everywhere, and consequently at any time, via a mobile radiotelephone. However, this does not apply without restriction. For, as a consequence of the low transmitting power of mobile radiotelephones, house walls of normal thickness are already able to bring about such an attenuation of the radio signals that the received field strength is insufficient for communication. Therefore the communication often fails precisely at those times when a businessman is located together with his mobile radiotelephone in his own house or office. As a result, many a business deal can slip though his fingers, and many businessmen would be pleased if the received field strength in their own house or office were sufficient for communication.

Co-channel broadband repeaters have already been employed for this purpose. In this case the decoupling between transmitting aerial and receiving aerial is very critical, and interference phenomena arise as a result of the amplification of additional frequencies which are not required, as well as, in certain circumstances, a heightened background noise, so these devices have not found widespread application in practice.

Although a transmitting/receiving device for amplification of the radio signals in a closed building has become known from EP 0 342 858, the installation effort associated with such a device is considerable, since on the one hand an aerial has to be placed on the roof of the building, and on the other hand this transmitting/receiving device is provided with a band-pass filter, the frequency of which has to be tuned by a person skilled in the art to the frequencies that are used in the radio cell in question. The effort associated with the installation of such a system is therefore enormously high.

This results in the problem giving rise to the invention, namely to create a transmitting/receiving device for selective amplification of, exclusively, the channels pertaining to a radio cell, which can be installed without prior knowledge and also with minimal effort and consequently also by technically unskilled people.

BRIEF SUMMARY OF THE INVENTION

The invention solves this problem by means of a device for automatic recognition of the radio channels or radio frequencies that are used in a radio cell pertaining to the radio network. Although the transmitting/receiving device according to the invention is, on the one hand, transparent—that is to say, it is not perceived at all, either by the radio network or by a mobile transmitting station—it is nonetheless provided with its own intelligence which permits it to be harmoniously integrated into the "frequency landscape" of the radio network. With a transmitting/receiving device of this type, therefore, no manual equalisation whatsoever of filter frequencies has to be carried out; rather, the setting-up procedure in accordance with simple rules which are specified in an operating manual is sufficient.

The channel spectrum of conventional mobile radio networks encompasses several types of radio channel: in each radio cell there is at least one broadcast control channel (bcch) which is constantly available for all mobile radio units and which, in the event of a call, allocates to said mobile radio units one of several slow dedicated control channels (sdcch) on which the transmission parameters for a radio link to be established between the radio network and the mobile station are then exchanged. For the actual communication, use is then made of traffic channels (tch). According to the GSM standard, each frequency channel comprises eight time-slots, each of which can be used as a bcch, sdcch or tch. On the other hand, the bcch, sdcch and tch which are used in a radio cell must not be assigned to the same frequency channel. In the following, the term "channel" is to be interpreted to mean "frequency channel". Since these frequency channels may be distinctly remote from one another in the frequency spectrum, the invention provides that a parallel transmitting/receiving branch, but preferably several such branches, is/are arranged in the transmitting/receiving device according to the invention.

Depending on the channel structure, of the radio network in question, the slow dedicated control channels and/or the traffic channels may in each instance be combined to form neighbouring groups. In such a case it is possible that the bandwidth of a transmitting/receiving branch comprises not only a single radio channel but several radio channels simultaneously, so that the latter are amplified jointly.

In order that the transmission frequencies of the broadcast control channel, of a slow dedicated control channel and/or of a traffic channel can be adapted arbitrarily so as to conform to the local conditions in the radio cell in question pertaining to the radio network, the transmitting frequencies of different transmitting/receiving branches should be capable of being set independently of one another. This also applies, for example, to transmission branches which are connected in antiparallel manner for bidirectional communication.

On an increasing scale, radio networks are currently being packed by frequency-converting repeaters which, however, with the exception of the frequency conversion, are otherwise transparent. Such repeaters define separate radio cells with transmitting frequencies that are delimited with respect to the neighbouring radio cells and have the characteristic feature that a radio signal with identical content is transmitted on the uplink and downlink sides of the repeater via two different transmitting frequencies, whereby the channel-number that is transmitted on the channel in question for the purpose of identification coincides exclusively with the transmission channel of the radio interface on the downlink side between the frequency-converting repeater and a mobile transmitting station, whereas this channel information for the "internal-network" communication between the actual, stationary transmitting station and the frequency-converting repeater does not coincide with the channel frequency that is used there. Here the invention provides that the transmitting/receiving device according to the invention is operated parallel to such a frequency-converting repeater—that is to say, it is directly coupled on the uplink side to the actual, stationary transmitting station and directly coupled on the downlink side to the mobile transmitting station. In this case the transmitting/receiving device according to the invention has to reproduce the frequency conversion of the repeater, for which purpose it is necessary that the frequencies of the uplink-side and downlink-side radio interfaces of a transmitting/receiving branch are capable of being set independently of one another. By this means, the transmitting/receiving device according to the invention can be operated both in radio cells without frequency conversion and in radio cells with frequency-converting repeaters.

To the extent that the transmitting/receiving device in question is operated in the radio cell of a frequency-converting repeater, the received signals and the signals transmitted further are decoupled from one another in frequency terms, so that it is possible to integrate an uplink-side aerial and a downlink-side aerial within the housing of the transmitting/receiving device. In this case it is even possible to make use of a single aerial for the uplink-side and downlink-side radio interfaces.

In order to obtain an adequate received field strength at the uplink-side radio interface, the invention recommends that the aerial in question be capable of being fastened to a window. In this regard it may be a question, for example, of a type of self-adhesive foil with enclosed aerial.

The primary criterion for the recognition of a radio channel that is used in a radio cell is constituted by the received field strength of said radio channel. With a view to ascertaining said received field strength, one or more measuring devices are present in the transmitting/receiving device. In order not to make the internal circuit of the transmitting/receiving device according to the invention too complicated, the invention provides that the devices for measuring the received field strength are each assigned to a transmitting/receiving branch. The measuring devices can consequently be totally integrated into the circuits of the transmitting/receiving branches.

Another criterion with a view to orientation in the "channel spectrum" of the radio cell in question is constituted by the information that is transmitted on the individual radio channels. In order to ascertain this information, the transmitting/receiving device according to the invention is provided with one or more devices for demodulation and/or decoding of radio signals. Here too, a separate demodulation device and/or decoding device may be assigned to each transmitting/receiving branch. The demodulation device or decoding device according to the invention is preferably coupled, or capable of being coupled, to the output of a receiving branch.

Furthermore, the transmitting/receiving device according to the invention has to recognise whether it is located in a radio cell with a direct radio link between a stationary transmitting station and a mobile transmitting station or in a radio cell that is supplied via a frequency-converting repeater. For this purpose, one or more modular units are provided in the transmitting/receiving device according to the invention for comparing the radio channel assigned to a channel frequency which is actually used with the channel-number that is received and demodulated on the frequency in question. In this connection it is favourable to convert the information in question into digital numbers and to compare the latter with one another by means of a comparator of binary design. These modular comparison units may also be present separately for each transmitting/receiving branch.

Finally, the radio channels or frequencies that have been found should be saved in a memory, so that in the event of a later channel command the transmitting/receiving device according to the invention can locate the corresponding transmitting frequencies immediately.

The channel-recognition device pertaining to the transmitting/receiving device according to the invention has to be operated in accordance with an ingenious process, in order to track down, in all possible types of mobile radio network, the channels that are used in the radio cell in question. In this connection, on the one hand different frequency ranges, as well as different signal codes, have to be taken into account. Furthermore, the channel-recognition device has to establish whether it is located in a radio cell with a direct radio link between a stationary transmitting station and a mobile radio station or in a radio cell with a frequency-converting repeater. In the latter case, both frequencies have to be ascertained for each channel, so that a parallel connection, in signal terms, with respect to the repeater which has been installed by the network operator is possible. With this channel recognition there may, in turn, be various preconditions: depending on the radio network, it is possible that the two frequencies of a channel are spaced from one another by a frequency offset which is fixed in each case, or it may be a question of a radio network with arbitrary channel allocations on the uplink and downlink sides of a repeater which has been installed by the operator. As elucidated in the following, a channel-recognition device according to the invention can be operated in accordance with a process that satisfies all the above requirements.

This process is distinguished in that, in a first step, the received field strength of the channels which are allocated to a radio network is ascertained and one or more broadcast control channels (bch) are ascertained from the channels having the greatest received field strength and in that said broadcast control channels are subsequently decoded, in order to ascertain, on the basis of the information transmitted there, the channels or frequencies of one or more slow dedicated control channels (sdcch) and/or traffic channels (tch). Of course, these steps may be preceded by an initialisation phase in which the owner of a transmitting/receiving device according to the invention sets the radio network that is utilised by his mobile radiotelephone with the aid of a selector switch. On the basis of the position of this selector switch the channel-recognition device can immediately find out from an internal memory the frequency range that is used by this radio network and possibly further characteristic features of this radio network, for instance whether or not use is made of frequency-converting repeaters. In a first step a favourable broadcast control channel is sought that is received with sufficient field strength by the transmitting/receiving device according to the invention. For this purpose, firstly a part of the frequency range or the entire frequency range of the radio network in question is gauged with regard to the received field strength which is related in each instance to a channel, and a note is made of the channels with the highest received field strengths. These channels are then decoded, in order to establish which channels serve for broadcast control. If the channel-recognition device has found an optimal broadcast control channel by this means, it can further evaluate the information that is transmitted on said channel.

In this connection it is possible that messages are transmitted on the broadcast control channels at predetermined time-intervals which contain information about the channels or frequencies which are used in the radio cell in question and that these messages are evaluated by the channel-recognition device. This measure according to the invention presupposes the co-operation of the network operator in question, who assists the installation of individual signal-amplification systems by generating appropriate messages and consequently makes his radio network more attractive for prospective customers. To the extent that a network operator makes such radio messages available in his radio network, the initialisation phase of a channel-recognition device according to the invention turns out to be relatively simple: after selection of an optimal broadcast control channel the latter is decoded, and a wait is observed for the next information message. The latter is then evaluated, in order to obtain all the necessary information for operation of the transmitting/receiving device according to the invention. It is advisable to examine regularly the received field strength of the selected broadcast control channel, as well as the content of the information messages transmitted there, since changes in the channel allocations are sometimes made by a network operator.

In addition to the information about the channels or frequencies that are used in the radio cell in question, by this means information can also be transmitted from which the channel-recognition device according to the invention can deduce whether it is located in a radio cell with frequency-converting repeaters which have been installed by the operator or in a radio cell that is supplied directly. from a stationary transmitting station; furthermore, information can be transmitted which contains an explanation about frequency offsets that are used in the radio cell in question, in particular whether in the case of frequency-converting repeaters a fixed frequency offset is observed. Furthermore, it is possible to transmit recommendations as to which radio zones or radio channels a transmitting/receiving device according to the invention is to assign itself to, to the extent that a selection option exists with regard to the received field strength. On the other hand, the traffic on particular channels or in particular radio cells or in radio subzones defined by other, frequency-converting transmitting stations can also be, measured, and in the event of utilisation at full capacity or overload an appropriate message can be generated which prevents additional transmitting/receiving devices according to the invention from being assigned to radio cells that are already overloaded.

If no such radio messages are made available in a mobile radio network, the channel-recognition device itself has to seek the channels in question (slow dedicated control channels sdcch and traffic channels tch). For this purpose, channel commands transmitted on the broadcast control channel that has been set are evaluated in a further step by the channel-recognition device. By this means, slow dedicated control channels sdcch can firstly be found, and subsequently, as a result of the decoding thereof, the traffic channels tch that are used in the radio cell in question. By this means it is possible for the device according to the invention to ascertain gradually all the relevant channels in the radio cell in question.

According to the process described above, it is possible to ascertain all the channels pertaining to the radio interface between a stationary transmitting station or a frequency-converting repeater and a mobile station. However, in a radio cell with a frequency-converting repeater it is desirable that the transmitting/receiving device according to the invention also ascertains the channels and frequencies pertaining to the radio interface between the stationary transmitting station and the frequency-converting repeater. To this end, firstly—beginning with the selected broadcast control channel—the channel-number that is transmitted and decoded there is compared with the channel frequency actually received. In the event of coincidence, the channel-recognition device knows that in this case it is a question of a radio interface to a mobile station; in the event of a discrepancy between these two channel-numbers, the transmitting/receiving device according to the invention receives a channel pertaining to the radio interface between the stationary transmitting station and a frequency-converting repeater.

In a radio cell with frequency conversion the transmitting/receiving device according to the invention is switched parallel to the repeater which has been installed there by the network operator, in that the transmitting/receiving device on the uplink side is tuned to the actual frequency of a channel, the actual channel frequency of which does not coincide with the transmitted channel-number, and on the other hand in that the transmitting/receiving device on the downlink side is tuned to the transmitted channel-number. On the one hand, this operation offers the advantage that the signal delay is reduced to a minimum. On the other hand, the signals of the transmitting/receiving device according to the invention on the uplink and downlink sides are separated from one another in frequency terms and are consequently optimally decoupled from one another, so that interference phenomena are almost totally ruled out.

The channels or frequencies of the slow dedicated control channels sdcch and traffic channels tch are also set, according to the above rule, so as to be separated from one another on the uplink and downlink sides. For this purpose, the relevant frequencies of these channels at the radio interface between the stationary transmitting station and the frequency-converting repeater also have to be determined. According to the invention this can be done by the actual channel frequency of a slow dedicated control channel sdcch and/or traffic channel tch, to the extent that the latter does not coincide with the transmitted channel-number, being ascertained by comparison of the transmitted messages with the messages transmitted on further channels that have been selected with regard to their received field strength. This process is necessary if neither an information message is made available by the network operator nor a fixed frequency offset is observed between channels that are assigned to one another pertaining to the two radio interfaces of a frequency-converting repeater. In such a case, further channels with sufficient received field strength are decoded, and the information and/or messages received there are compared with the corresponding information contents of the radio interface between the frequency-converting repeater and the mobile station, in order to establish a correlation. This process is repeated until such time as the second frequency, which is used on the uplink side of the frequency-converting repeater, of the information channel in question has been found.

In order to perform such a comparison, several receiving branches of the transmitting/receiving device according to the invention may be operated simultaneously. If this is not possible, messages transmitted sequentially during a connection set-up can be drawn upon for the information comparison.

In order to obtain the acquired information for further operation of the transmitting/receiving device according to is the invention, the invention finally provides that the channel-numbers and the actual channel frequencies corresponding to one another are stored in correlated form. Accordingly, if the device according to the invention decodes a channel command at a later time, by read-out of the memory it is in a position to recognise the frequencies immediately to which the transmitting/receiving devices on the uplink and downlink sides are to be set.

BRIEF DESCRIPTION OF THE SEVERAL VIEWS OF THE DRAWINGS

Further features, particulars and advantages on the basis of the invention will become clear from the following description of an example of an embodiment of the invention and also with reference to the drawing, which shows in FIG. 1 an overall diagram of the communication in a radio cell, FIG. 2 a block diagram of a transmitting/receiving device according to the invention in the case where it is used in a radio cell with frequency conversion, FIGS. 3–6 parts of a flow chart for the operating process according to the invention, and also FIG. 7 a detail from a radio networks.

DETAILED DESCRIPTION OF THE INVENTION

Figure 1:
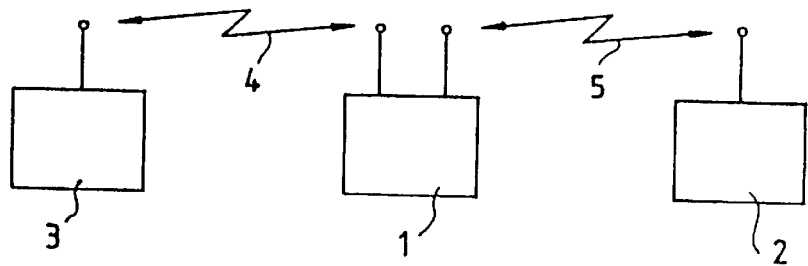

In FIG. 1 a transmitting/receiving device 1 according to the invention is reproduced which, with a view to improving the signal reception of a mobile radio station 2, is inserted between the latter and the stationary transmitting station 3 of the radio cell in question. This consequently results in a radio interface 4 to the stationary transmitting station 3 as well as a radio interface 5 to the mobile station 2. Depending on whether, without the transmitting/receiving device 1 according to the invention, the mobile station 2 in the radio cell in question would communicate with the stationary transmitting station 3 directly or via an interposed frequency-converting repeater, the two radio interfaces 4, 5 have either identical frequencies or frequencies that differ from one another.

In the simplest case the transmitting/receiving device 1 according to the invention supports only one mobile station 2, the identification-number of which is programmed in, as a result of which the structure of the device according to the invention is simplified into a single transmitting/receiving branch or two branches which are connected in antiparallel manner with respect to one another, even if the cell itself is revealed to be several channels (single-channel repeater). In general, however, the device 1 according to the invention is equipped for use in office blocks having several transmitting branches (multichannel repeaters).

In order to be able to tune themselves adaptively to the conditions in a particular radio cell, the transmitting branches of the transmitting/receiving device 1 according to the invention are capable of being set independently of one another in terms of channel or frequency. The channels that are used in the radio cell in question are ascertained by a channel-recognition unit integrated within the transmitting/receiving device 1 and are stored and drawn upon with a view to setting the transmitting branches. For this purpose, the channel-recognition device receives information about the frequency and the received field strength of a received signal, as well as information about the decoded messages.

Figure 2:
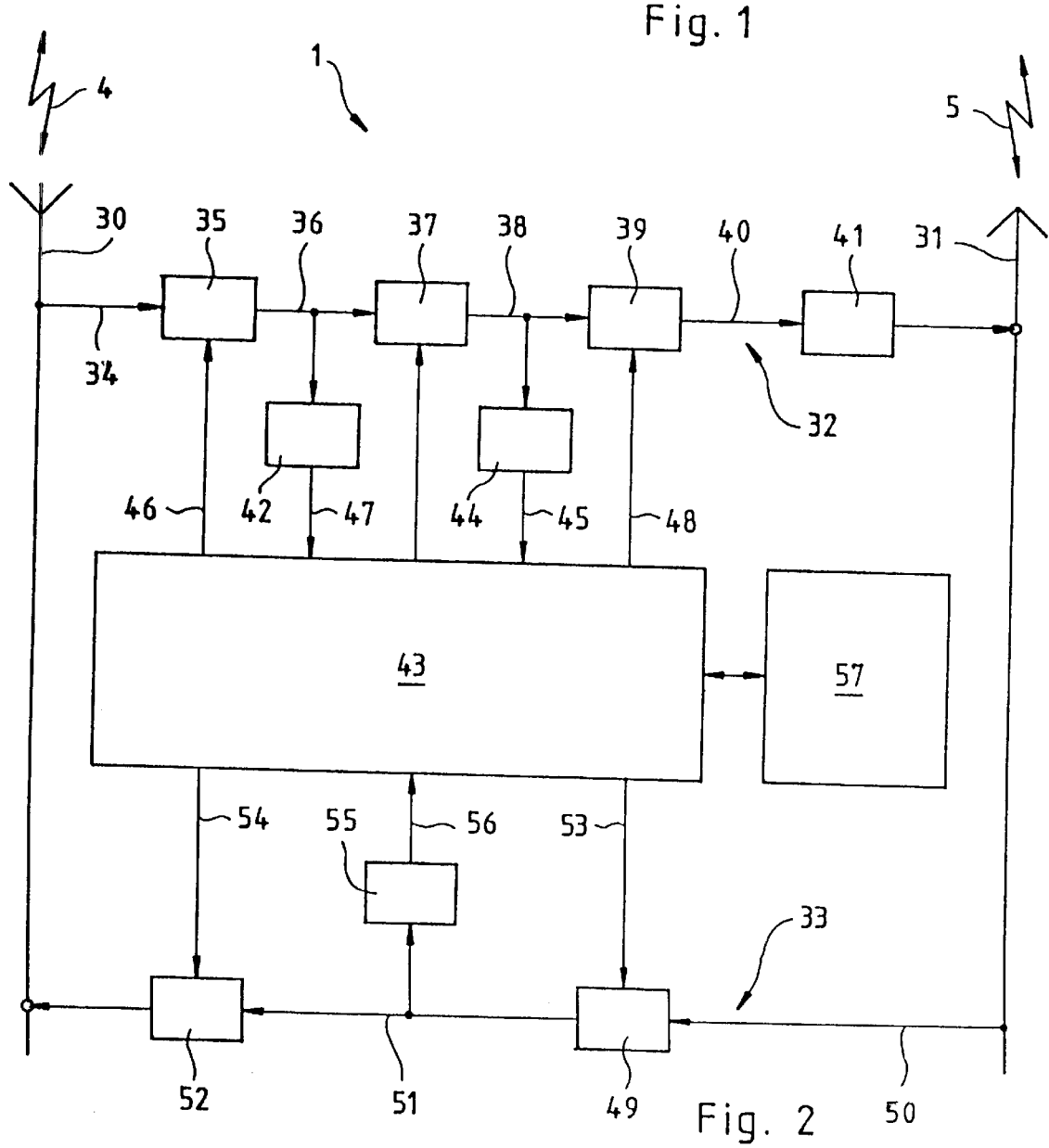
Figure 3:
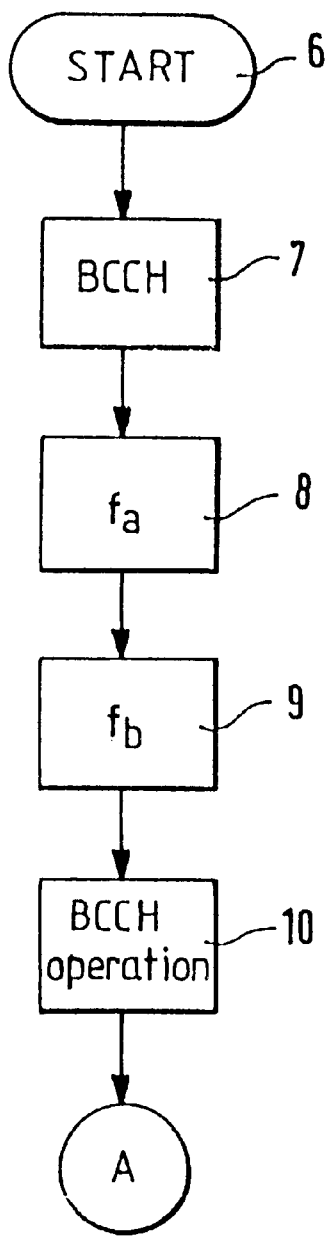

The internal structure of a single-channel repeater 1 according to the invention is represented in FIG. 2. A first aerial 30 for uplink-side communication via the radio interface 4 with a stationary transmitting station 3 pertaining to the radio cell 25 in question and a second aerial 31 for downlink-side communication via the radio interface 5 to the mobile station 2 can be discerned. In an amplifying signal branch 32 which is directed towards the downlink side, signals which are received at the aerial 30 are amplified and emitted at the aerial 31, whereas a signal path 33 which is connected thereto in antiparallel manner conducts signals received by the mobile station 2 via the aerial 31 to the aerial 30, where they are emitted with amplified amplitude in the direction towards the stationary transmitting station 3.

In the signal path 32 on the downlink side the aerial input signals 34 are firstly filtered 35 in channel-selective manner, and the selected receiving channel 36 is then mixed down to a fixed intermediate frequency 38 in a heterodyning stage 37 connected downstream, in order then to be converted in a further heterodyning stage 39 to the desired output frequency 40, amplified 41 and emitted from the aerial 31.

A measuring circuit 42 is capable of ascertaining the received field strength in question from the signal 36 which has been filtered in channel-selective manner and of transmitting the measured result to an evaluating module 43. The evaluating module 43 further receives the signal 45 which is demodulated and optionally decoded in a module 44 coupled to the intermediate-frequency signal 38 and which is directed towards the downlink side.

On the other hand, the evaluating module 43 is coupled by means of relevant control lines 46–48 to the aerial input filter 35 and to the two mixer stages 37, 39, in order to be able to set both the receiving frequency 34 and the transmitting frequency 40 independently of one another.

The evaluating module 43 is consequently rendered capable of setting an arbitrary receiving channel 34 and of measuring the assigned received field strength 36 and furthermore also of demodulating and optionally decoding the transmitted signal, in order to be able to evaluate the content thereof.

In the signal branch 33 on the uplink side a filtering of the aerial input signal 50 as well as a conversion to a fixed intermediate frequency 51 likewise take place in a first module 49. From this fixed intermediate frequency 51 a module 52 which is connected downstream can generate a desired transmitting frequency and amplify the signal to the desired transmitting power, so that it is emitted from the aerial 30 in the direction towards the stationary transmitting station 3. In order also to be able to tune the signal path 33 on the uplink side to the various frequency requirements in a radio cell 25, the evaluating unit 43 is rendered capable, via control lines 53, 54, of tuning the receiving module 49 as well as the transmitting module 52 to particular signal frequencies independently of one another.

In the case of the embodiment of a single-channel repeater 1 which is represented, the evaluating unit 43 must additionally decide whether a connection set-up is desired by the authorised mobile station 2 or by another, extraneous mobile station. To this end, the transmitted signal 33 on the uplink side which is converted to a fixed intermediate frequency 51 is demodulated and optionally decoded in a module 55 which is coupled to the intermediate-frequency signal 51, so that the evaluating unit 43 can recognise from the decoded signal 56 the identification-number of the mobile station 2 and can optionally become active.

The correspondences that are found by the evaluating unit 43 in accordance with the process described in the following between the channel-numbers and channel frequencies that are used in the radio cell 25 in question are saved by the evaluating unit 43 in a memory module 57, so that they are available on demand at any time. The evaluating unit 43 may, for example, take the form of a microprocessor.

The mode of operation of this channel-recognition device will be elucidated in the following with reference to FIGS. 3 to 6.

After the setting-up and switching-on 6 of the transmitting/receiving device 1 according to the invention, the latter examines, on the basis of the selector switches that have been set, which radio network is being used by the user and fetches information from an internal memory regarding the transmission channels that are allocated to the radio network in question. In a first step 7 these transmission channels are then set in succession on a receiving branch, and in each case the received field strength is measured. In this connection the channel-recognition device stores, for example, 10 numbers of channels that are received with the highest field strength. These channels are then demodulated and evaluated, in order to select all the broadcast channels bcch from said channels.

In radio cells with frequency conversion it further has to be established whether a selected bcch channel is to be assigned to the uplink-side radio interface 4 or to the downlink-side radio interface 5. For this purpose, in a further step 8 the channel-numbers transmitted on the selected bcch channels with a view to identification are compared with the channels that were set on the receiver side 1. If these channel-numbers coincide, then it is a question of the downlink-side radio interface 5 to the mobile station 2, since in every radio network the correct channel-numbers are transmitted to a mobile station 2, whereas in the case of a frequency conversion the information that is exchanged on the uplink side of the repeater does not designate the correct channels, as a consequence of the frequency conversion. In step 8 firstly all the bcch channels of the uplink-side interface 4 are ascertained. In a step 9 following this, the channel information 9 which is transmitted there is then read, in order to ascertain the channels of the downlink-side radio interface 5. In addition, from the broadcast control channels bcch of the downlink-side radio interface 5 that are ascertained in such a manner the broadcast control channel $f_b$ that has the highest received field strength is selected in this step 9. The frequency $f_b$ as well as the assigned frequency $f_a$ is stored in a modular memory unit pertaining to the device 1.

In a step 10 following this, a transmitting/receiving branch of the device 1 according to the invention is set on the downlink side 5 to the frequency $f_b$ of the broadcast control channel that has been found, whereas on the uplink side 4 the assigned frequency $f_a$ is set, and with respect to this channel a first operation of the transmitting/receiving device 1 according to the invention can now be begun.

As a result of this selection of an optimal broadcast control channel, the device 1 according to the invention has already been assigned to a radio cell pertaining to the radio network. Since the channel allocations within a radio network may be changed by the operator under special conditions, the device 1 according to the invention regularly carries out field-strength measurements and message evaluations on the broadcast control channel in question, in order to be able to register changes immediately.

Figure 4:
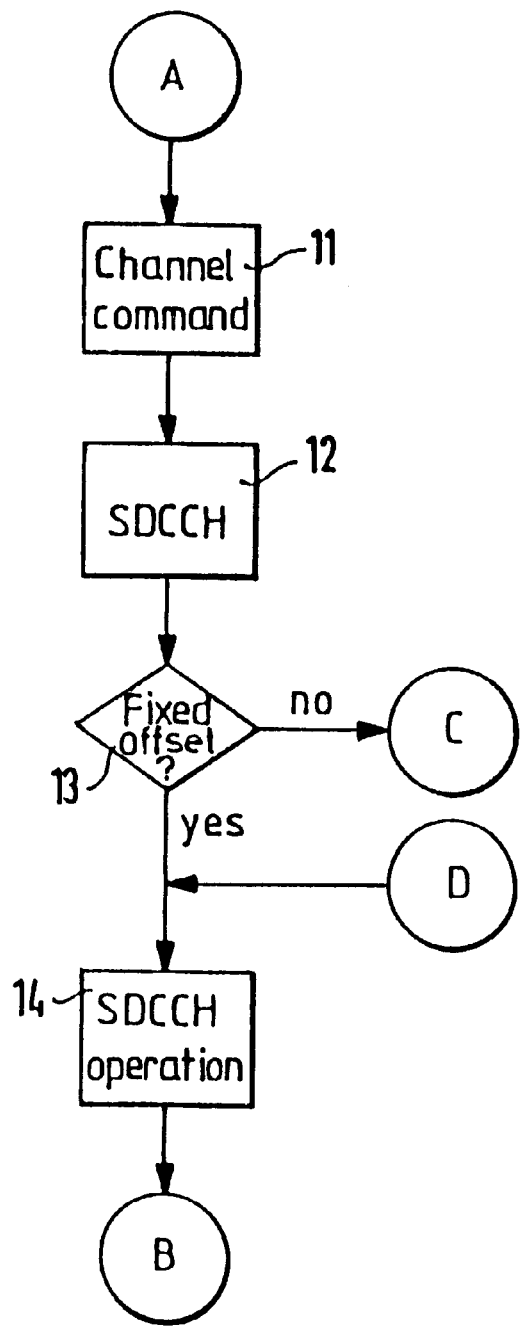

After the event A has been reached, the program that is saved in the channel-recognition device pertaining to the device 1 according to the invention is continued at the corresponding program point A in FIG. 4. The program sequence between the points A and B serves to ascertain a control channel assigned to the radio cell and can be passed through several times, in order to pick out all the control channels that are used in the radio cell in question.

Firstly, the program is in the state 11, where as a result of decoding of the broadcast control channel that has been set a wait is observed for a channel command which is transmitted from the stationary transmitting station 3. This channel is then set in a further step 12. In the case of a radio cell with a frequency-converting repeater it is a question here of the frequency on the downlink side 5, and what has to be done now is to ascertain the frequency on the uplink side 4 that matches said frequency on the downlink side.

For this purpose, the channel-recognition device pertaining to the transmitting/receiving device 1 firstly enquires amongst the stored information relating to the radio network in question whether this radio network makes information messages available or makes use of a constant frequency offset between uplink-side and downlink-side radio interfaces 4, 5 (query 13). In these cases the radio channel 4 on the uplink side can be ascertained from the transmitted messages or from the fixed channel offset, and the device 1 according to the invention can immediately begin the full transmission operation 14 with respect to this control channel 12.

If information messages are not made available by the radio network in question and if use is not made of a fixed channel offset, with a view to ascertaining the transmitting frequency 4 on the uplink side a further part of the program between program points C and D has to be passed through (FIG. 6). In this connection, in a step 15 the information pertaining to the control channel on the downlink side 5 is decoded. In a further step 16 the further channels are selected by measurement of the field strength, and the transmitted information is decoded 17. In a step 18 the program now examines, channel by channel, whether the messages which were decoded in steps 15, 17 coincide. If this is the case, these channels are assigned to one another 19 and are stored in this form. If the compared sets of information are not identical, the sets of information pertaining to further channels are decoded 17 and compared once again with the reference signal 15.

With the assignment 19 which has been found, the program branches again after reaching point D to the program sequence A-B according to FIG. 4 and is now capable of setting up, with respect to the control channel which has been found, a separate transmitting/receiving branch with uplink-side and downlink-side radio interfaces 4, 5.

In order also to ascertain the traffic channels that are used for the actual communication, the program is continued at point D with the corresponding part of the program in FIG. 5. In this connection the phase 20 largely corresponds to the operating state 14—that is to say, the device 1 according to the invention transmits the slow dedicated control channel sdcch in question and simultaneously decodes the latter, in order to recognise a channel command. In such a case, in the following step 21 a transmitting/receiving branch is set to the traffic channel tch in question. In the case of a radio cell without frequency conversion, this would have to be effected both for the uplink-side 4 radio interface and for the downlink-side 5 radio interface. In the case of a radio cell with frequency conversion, in the following step 22 a query is performed as to whether, in the case of the radio network in question, information messages are made available or whether a fixed frequency offset is observed between uplink-side and downlink-side radio interfaces 4, 5. If the latter is the case, the uplink-side 4 channel can be immediately ascertained, stored and set 23 at the transmitting/receiving branch in question, with which the program reaches a temporary end-point 24. If a frequency conversion takes place in the radio cell in question, and if neither a message is made available nor a fixed frequency offset is observed, the program has to execute the program sequence between points C and D [sic] once again, in order to ascertain the uplink-side 4 traffic channel tch.

Figure 7:
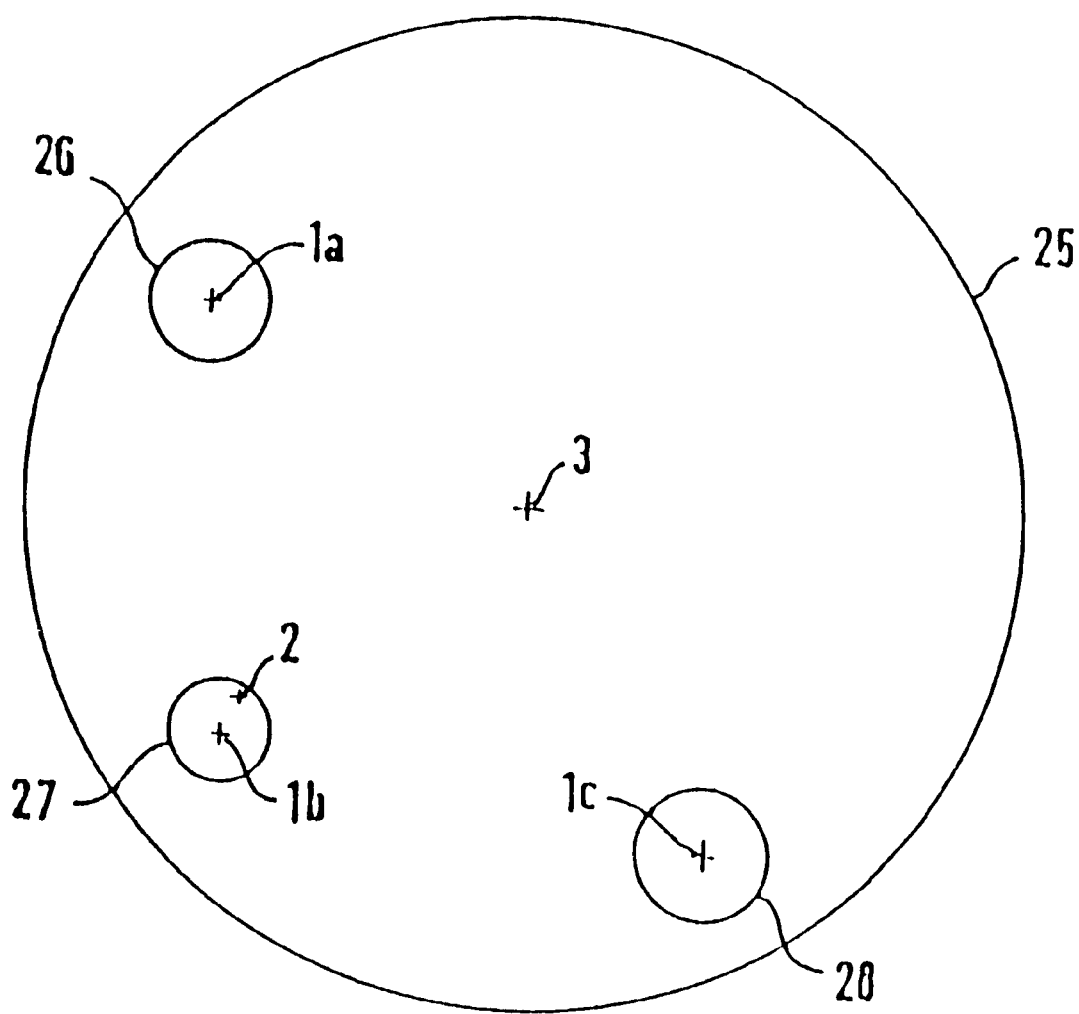

FIG. 7 represents a detail from a radio network with a stationary transmitting station 3 which supplies a radio cell 25. At each of three locations that are independent of one another, fairly large office blocks for example, a transmitting/receiving device 1a, 1b, 1c according to the invention is respectively set up. Each of the latter generates, respectively, a separate radio zone 26, 27, 28 in which the downlink-side frequencies 5 differ from the uplink-side frequencies 4 connecting to the central transmitting station 3. Each of these transmitting/receiving devices 1a, 1b, 1c which have been set up by the users of the radio network in question has the possibility of assigning to itself one of the bcch channels which are used by the stationary transmitting station 3. If, in this connection, the bcch channel of the radio cell 25 is used, the devices 1a, 1b, 1c according to the invention have to be operated on the uplink and downlink sides at the same frequencies, which can result in interference phenomena. Therefore there may be provision that the network operator, for the precise purpose of customer-specific packing of his radio network, reserves additional channels in one or more stationary radio stations 3 expressly for the linkage of customer-specific transmitting/receiving devices 1a, 1b, 1c, which make operation with frequency conversion possible. Since, in this connection, the actual transmitting frequencies emitted from the stationary transmitting station 3 do not coincide with the channel-numbers transmitted there, these channels are unsuitable for direct communication with a mobile station 2. If, however, an additional transmitting/receiving device 1a is installed, the latter can optionally assign itself to the already extant radio cell 25 or, with the aid of an additional channel that is reserved by the stationary transmitting station 23, can create a separate radio cell 26 for itself by frequency conversion.

In order to discover a sufficient decision-making criterion for such a selection, on the bcch channels of the stationary transmitting station 3 a priority message can be transmitted which is addressed to additionally installed transmitting/receiving devices 1a–1c and, to the extent that a selection is possible with regard to the received field strength, informs each of said devices which radio cell it is to assign itself to. By reason of this priority recommendation, the transmitting/receiving devices 1a, 1b, for example, have assigned themselves, by utilising the same bcch channel with their radio zones 26, 27, to a second radio cell which is not differentiated in frequency terms but which, in comparison with the original radio cell 25, is operated with frequency conversion—that is to say, with a delimitation in frequency terms.

On the channels pertaining to this second radio cell 26, 27 the traffic occurring there is now measured by the network operator and it is established that these channels are being utilised at full capacity. Therefore an additional blocking message is now transmitted from the stationary transmitting station 3 on the broadcast control channels bcch, which signals to the further transmitting/receiving device 1c to be installed later that, despite the recommendation, the latter is not to assign itself to the already overcrowded second radio cell 26, 27 but, by utilising further, additional frequencies, is to create a separate radio cell 28 that is capable of being distinguished from the already extant radio cells 25; 26, 27.

By this means, despite a radio-network geography that is configured in largely individual manner, the assignment in frequency terms can be largely controlled by the network operator, so that the latter retains control of his radio network.

As a result of field-strength-dependent or message-dependent disconnection of a transmitting branch of the transmitting/receiving device 1 according to the invention, the background noise as well as the interference phenomena in the radio cell in question can be reduced further.

What is claimed is:

1. An improved transmitting/receiving device for amplification of transmitted signals between a stationary, uplink-side, transmitting station and a mobile, downlink-side transmitting station in a full-coverage radio network, the device having at least one aerial for linkage to the stationary transmitting station, at least one channel-selective filter connected to the aerial, at least one circuit connected to the filter output for measuring the received field strength of a channel, at least one radio signal demodulator/decoder for filtering the radio signal in a channel selective manner and a circuit connected thereto for recognizing the radio channels or radio frequencies which are used in a radio cell of the radio network, wherein the improvement comprises:

the circuit for recognizing the radio channels or radio frequencies which are used in a radio cell of the radio network includes means for ascertaining the received field strength of the channels which are allocated to the radio network and for ascertaining one or more broadcast control channels from the channels having the greatest received field strength and subsequently decoding the broadcast control channels to ascertain, on the basis of information transmitted therein, the channels or frequencies of one or more slow dedicated control channels and/or traffic channels.

2. Transmitting/receiving device according to claim 1 having at least one parallel and/or antiparallel transmitting/receiving branches.

3. Transmitting/receiving device according to claim 2, wherein the bandwidth of the transmitting/receiving branches comprises at least one radio channel in each case.

4. Transmitting/receiving device according to claim 2 or claim 3 wherein transmitting frequencies of the transmitting/receiving branches are capable of being set independently of one another.

5. Transmitting/receiving device according to claim 2 wherein each transmitting/receiving branch has uplink-side and downlink-side radio interfaces having frequencies capable of being set independently of one another.

6. Transmitting/receiving device according to claim 5 and further comprising an uplink-side aerial and a downlink-side aerial integrated within a housing.

7. Transmitting/receiving device according to claim 5 and further comprising a common aerial for the uplink-side and the downlink-side radio interfaces.

8. Transmitting/receiving device according to claim 2 wherein the circuits for measuring the received field strength are each assigned to a transmitting/receiving branch.

9. Transmitting/receiving device according to claim 2 wherein each demodulator/decoder is assigned to a transmitting/receiving branch.

10. Transmitting/receiving device according to claim 1 and further comprising modular units for comparing the radio channel assigned to a channel frequency which is actually used with a channel-number that is received on a frequency and demodulated or decoded.

11. Transmitting/receiving device according to claim 10, wherein modular comparison units are each assigned to a transmitting/receiving branch.

12. Transmitting/receiving device according to claim 1 and further comprising a memory for storing the recognised radio channels or radio frequencies.

13. Process for operating the channel-recognition circuit of a transmitting/receiving device for amplification of transmitted signals between a stationary, uplink-side, transmitting station and a mobile, downlink-side transmitting station in a full-coverage radio network, the device having at least one aerial for linkage to the stationary transmitting station, at least one channel-selective filter connected to the aerial, at least one circuit connected to the filter output for measuring the received field strength of a channel, at least one radio signal demodulator/decoder for filtering the radio signal in a channel selective manner and a circuit connected thereto for recognizing the radio channels or radio frequencies which are used in a radio cell of the radio network the process comprising: ascertaining the received field strength of the channels which are allocated to a radio network and one or more broadcast control channels from the channels having the greatest received field strength and subsequently decoding said broadcast control channels in order to ascertain, on the basis of the information transmitted there, the channels or frequencies of one or more slow dedicated control channels and/or traffic channels.

14. Process according to claim 13, wherein messages are transmitted on the broadcast control channels at predetermined time-intervals which contain information about the channels or frequencies which are used in a radio cell and these messages are evaluated by the channel-recognition circuit.

15. Process according to claim 13 or 14, wherein messages are transmitted on the broadcast control channels at predetermined time-intervals which contain information about whether a frequency-converting repeater is installed in a radio cell and these messages are evaluated by the channel-recognition circuit.

16. Process according to claim 13, wherein messages are transmitted on the broadcast control channels at predetermined time-intervals which contain particular frequency-offset values which are used in a radio cell and these messages are evaluated by the channel-recognition circuit.

17. Process according to claim 13, wherein messages are transmitted on the broadcast control channels at predetermined time-intervals which contain recommendations with regard to the assignment to particular channels which are provided for a radio cell and these messages are evaluated by the channel-recognition circuit.

18. Process according claim 13, wherein traffic on the channels is measured and messages are transmitted on the broadcast control channels at predetermined time-intervals which indicate the utilisation at full capacity or the overloading of individual channels pertaining to a radio cell and are evaluated by the channel-recognition circuit.

19. Process according to claim 13, wherein channel commands are transmitted on the broadcast control channels and are evaluated by the channel-recognition circuit.

20. Process according to claim 13, wherein as a result of decoding of the broadcast control channels the frequency thereof is ascertained and is compared with the channel frequency that is actually received.

21. Process according to claim 20, wherein a search is made for a broadcast control channel, the actual channel frequency of which does not coincide with the transmitted channel-number.

22. Process according to claim 20 or 21, an uplink-side transmitting/receiving device is tuned to an actual channel frequency of a channel, and a downlink-side transmitting/receiving device is tuned to a channel having the transmitted channel-number.

23. Process according to claim 13, wherein an actual channel frequency of a slow dedicated control channel and/or traffic channel, to the extent that the latter does not coincide with a transmitted channel frequency, is ascertained by comparison of transmitted messages with messages transmitted on further channels which are selected with regard to their received field strength.

24. Process according to claim 23, wherein messages transmitted sequentially during a connection set-up are drawn upon for the comparison.

25. Process according to claim 23 or 24, wherein for the comparison a comparison channel is received and demodulated in a second receiving device.

26. Process according to claim 13, wherein channel-numbers and actual channel frequencies corresponding to one another are stored in assigned form.

27. Process according to claim 13, wherein the transmitting/receiving device has a number of transmitting branches which is smaller than the number of frequency channels which are used in its associated radio cell, and wherein an identification-number is transmitted from a mobile station and is evaluated, in order to enable a mobile-station-selective change-over of channels.

* * * * *